(12) United States Patent
Grant

(10) Patent No.: US 11,907,014 B2
(45) Date of Patent: Feb. 20, 2024

(54) SMARTPHONE HOLDING ASSEMBLY

(71) Applicant: Emanuel Grant, East Orange, NJ (US)

(72) Inventor: Emanuel Grant, East Orange, NJ (US)

( * ) Notice: Subject to any disclaimer, the term of this patent is extended or adjusted under 35 U.S.C. 154(b) by 82 days.

(21) Appl. No.: 17/578,089

(22) Filed: Jan. 18, 2022

(65) Prior Publication Data
US 2023/0229192 A1    Jul. 20, 2023

(51) Int. Cl.
| | |
|---|---|
| *G06F 1/16* | (2006.01) |
| *H04B 1/3877* | (2015.01) |
| *H04M 1/04* | (2006.01) |
| *H04W 12/50* | (2021.01) |
| *H04R 5/02* | (2006.01) |

(52) U.S. Cl.
CPC ......... *G06F 1/1632* (2013.01); *H04B 1/3877* (2013.01); *H04M 1/04* (2013.01); *H04R 5/02* (2013.01); *H04W 12/50* (2021.01); *H04M 2201/08* (2013.01); *H04R 2205/021* (2013.01)

(58) Field of Classification Search
None
See application file for complete search history.

(56) References Cited

U.S. PATENT DOCUMENTS

| | | | | |
|---|---|---|---|---|
| 7,170,427 B2 * | 1/2007 | Hsu | ........................ | G08C 17/00 |
| | | | | 361/679.01 |
| 7,524,197 B2 | 4/2009 | Mills | | |
| 7,738,238 B2 * | 6/2010 | Liu | ........................ | H04N 5/64 |
| | | | | 361/679.01 |
| 8,145,821 B2 * | 3/2012 | Mead | .................... | G06F 1/1632 |
| | | | | 361/679.55 |
| 8,780,548 B2 | 1/2014 | Lee | | |
| 9,169,959 B2 | 10/2015 | Zito | | |
| 9,628,913 B2 | 4/2017 | Miller | | |
| 9,684,337 B2 | 6/2017 | Jones, II | | |
| 10,470,564 B2 | 11/2019 | Li | | |
| 10,819,921 B2 | 10/2020 | Roth | | |
| 11,507,134 B2 * | 11/2022 | Yamamoto | ............ | G06F 1/1681 |
| 2006/0091853 A1 * | 5/2006 | Briggs | .................. | G06F 1/1632 |
| | | | | 320/114 |
| 2006/0280045 A1 * | 12/2006 | Ritsher | ..................... | H04R 5/02 |
| | | | | 369/30.01 |
| 2008/0205070 A1 * | 8/2008 | Osada | ................... | G06F 1/1632 |
| | | | | 362/368 |
| 2008/0266783 A1 * | 10/2008 | Mills | ..................... | G06F 1/1632 |
| | | | | 361/679.44 |
| 2014/0268542 A1 * | 9/2014 | Moon | ..................... | H01R 13/44 |
| | | | | 361/679.41 |
| 2016/0150067 A1 | 5/2016 | Khaliqi | | |
| 2017/0278477 A1 * | 9/2017 | Jeong | ....................... | G06F 1/181 |
| 2018/0174584 A1 * | 6/2018 | Chih | ...................... | F16M 11/10 |
| 2019/0369593 A1 * | 12/2019 | Murakami | ............ | G06V 10/24 |

FOREIGN PATENT DOCUMENTS

WO    WO2018109437    6/2018

\* cited by examiner

*Primary Examiner* — Xanthia C Relford

(57) ABSTRACT

A smartphone holding assembly includes a bowl that is positionable on a support surface. A sphere is rotatably disposed in the bowl and the sphere extends upwardly from the bowl. A mating unit is coupled to the sphere and the mating unit is matable to a personal electronic device. A pair of speakers is each of the speakers is positioned within the bowl to emit audible sounds received from the personal electronic device. A communication unit is integrated into the bowl to be wirelessly paired to the personal electronic device for streaming data from the personal electronic device.

6 Claims, 5 Drawing Sheets

SMARTPHONE HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holding devices and more particularly pertains to a new holding device for positioning a personal electronic device at a preferred orientation. The device includes a bowl, a sphere rotatably disposed on the bowl and a mating unit positioned on the sphere. The mating unit magnetically engages the personal electronic device. The device includes a communication unit that is integrated into the bowl and which wireless streams data from the personal electronic device.

(2) Description of Related Art Including Information Disclosed Under 37 CFR 1.97 and 1.98

The prior art relates to holding devices including a docking station that includes a rectangular well for receiving a smart phone. The prior art discloses a docking station that includes an engagement that is rotatable about a single rotational axis and which can engage a smart phone. The prior art discloses a pear shaped smart phone holder for holding a variety of sizes of smart phones. The prior art discloses a smart phone mouth that includes a base portion and an engagement portion that is pivotable on the base portion about a single axis of rotation. The prior art discloses a smart phone holder that includes a dome, a stem extending upwardly from the dome and a sphere disposed on a distal end of the stem upon which a smart phone is disposed.

BRIEF SUMMARY OF THE INVENTION

An embodiment of the disclosure meets the needs presented above by generally comprising a bowl that is positionable on a support surface. A sphere is rotatably disposed in the bowl and the sphere extends upwardly from the bowl. A mating unit is coupled to the sphere and the mating unit is matable to a personal electronic device. A pair of speakers is each of the speakers is positioned within the bowl to emit audible sounds received from the personal electronic device. A communication unit is integrated into the bowl to be wirelessly paired to the personal electronic device for streaming data from the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
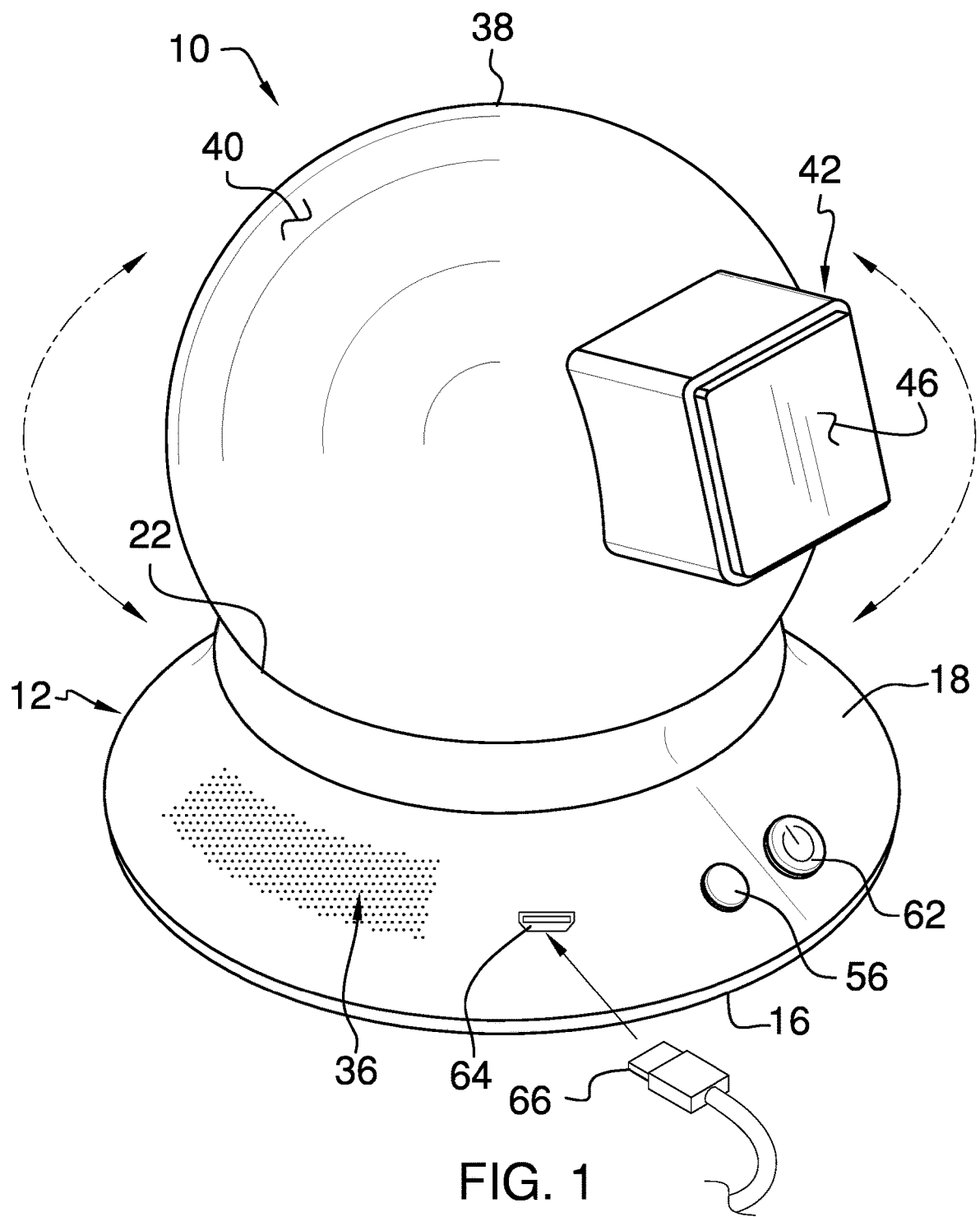
FIG. 1 is a front perspective view of a smartphone holding assembly according to an embodiment of the disclosure.
Figure 2:
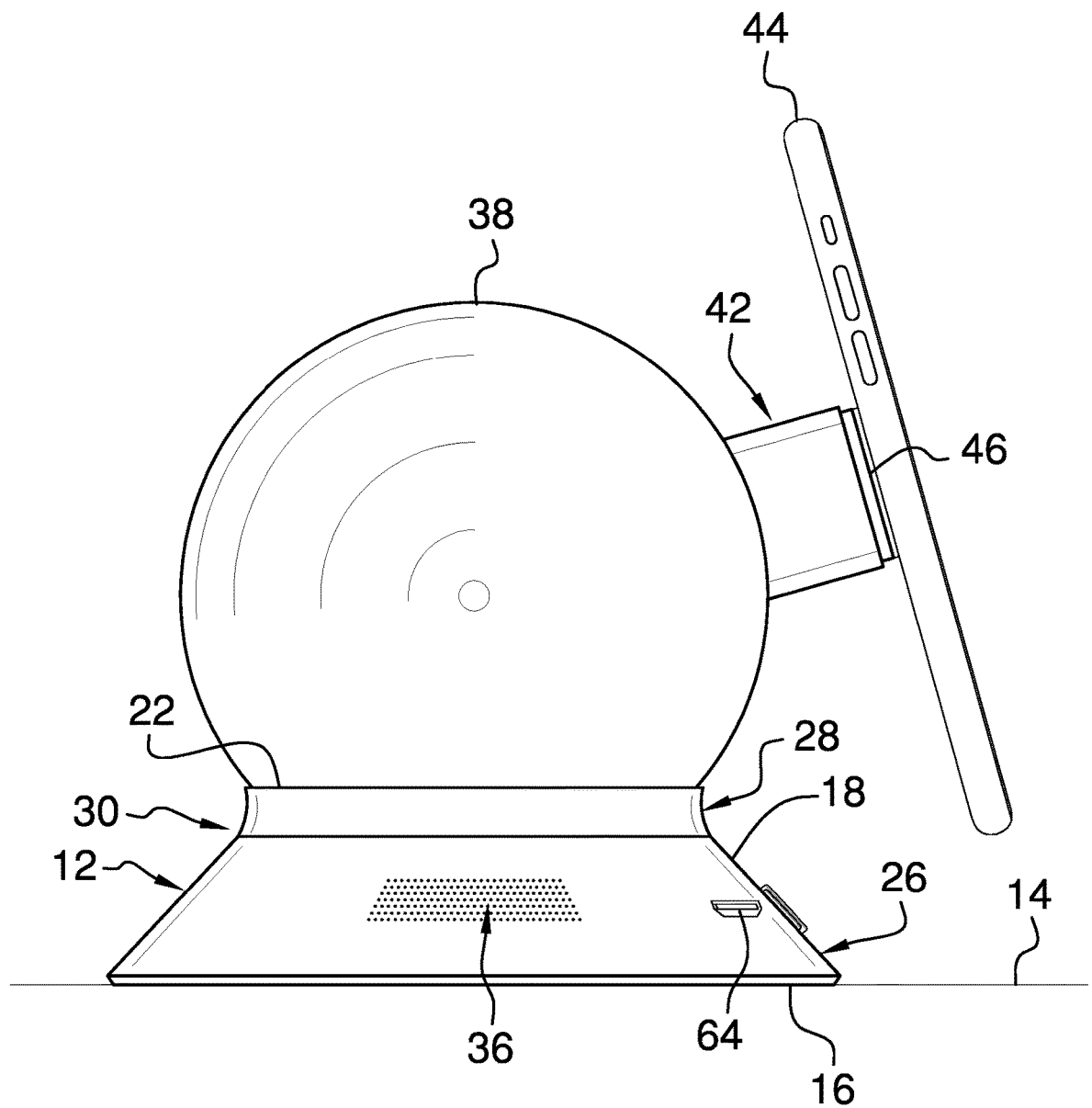
FIG. 2 is a right side view of an embodiment of the disclosure.
Figure 3:
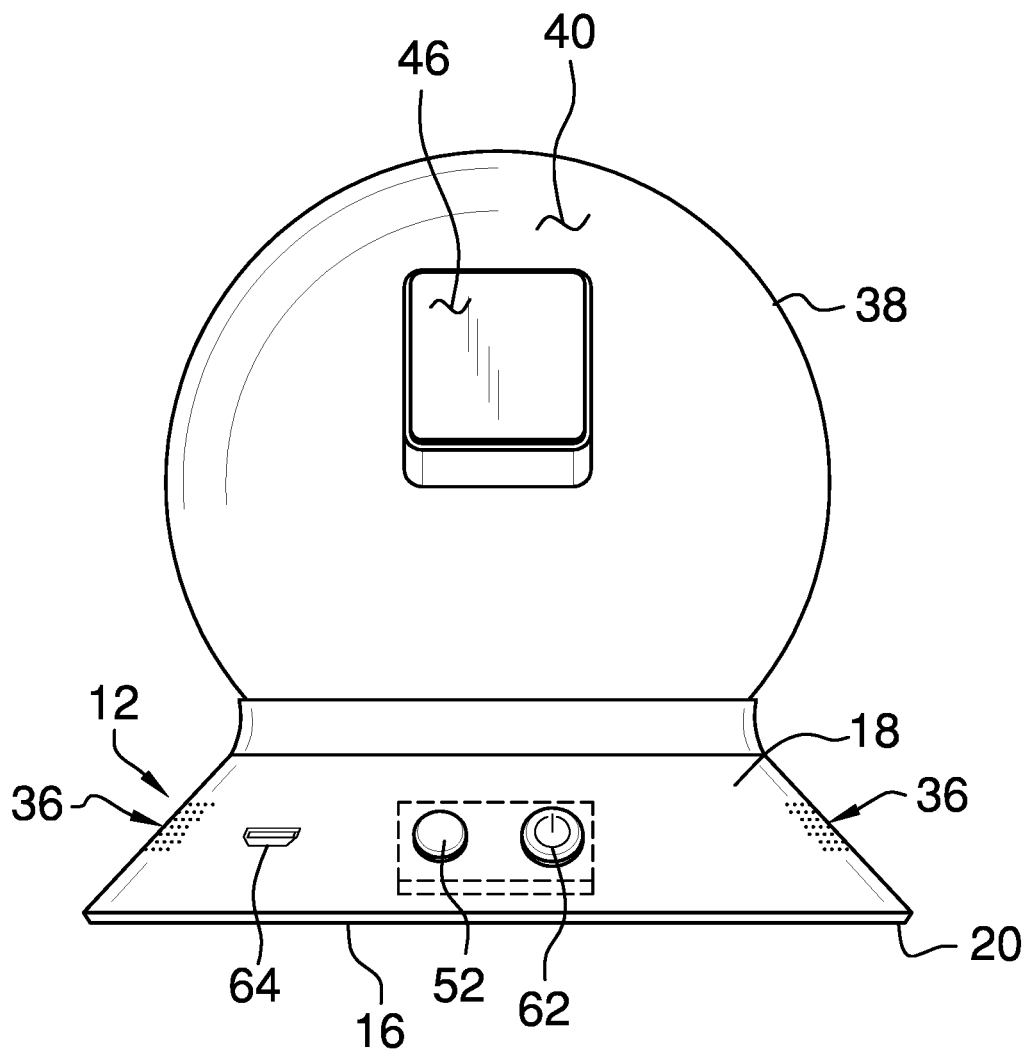
FIG. 3 is a front view of an embodiment of the disclosure.
Figure 4:
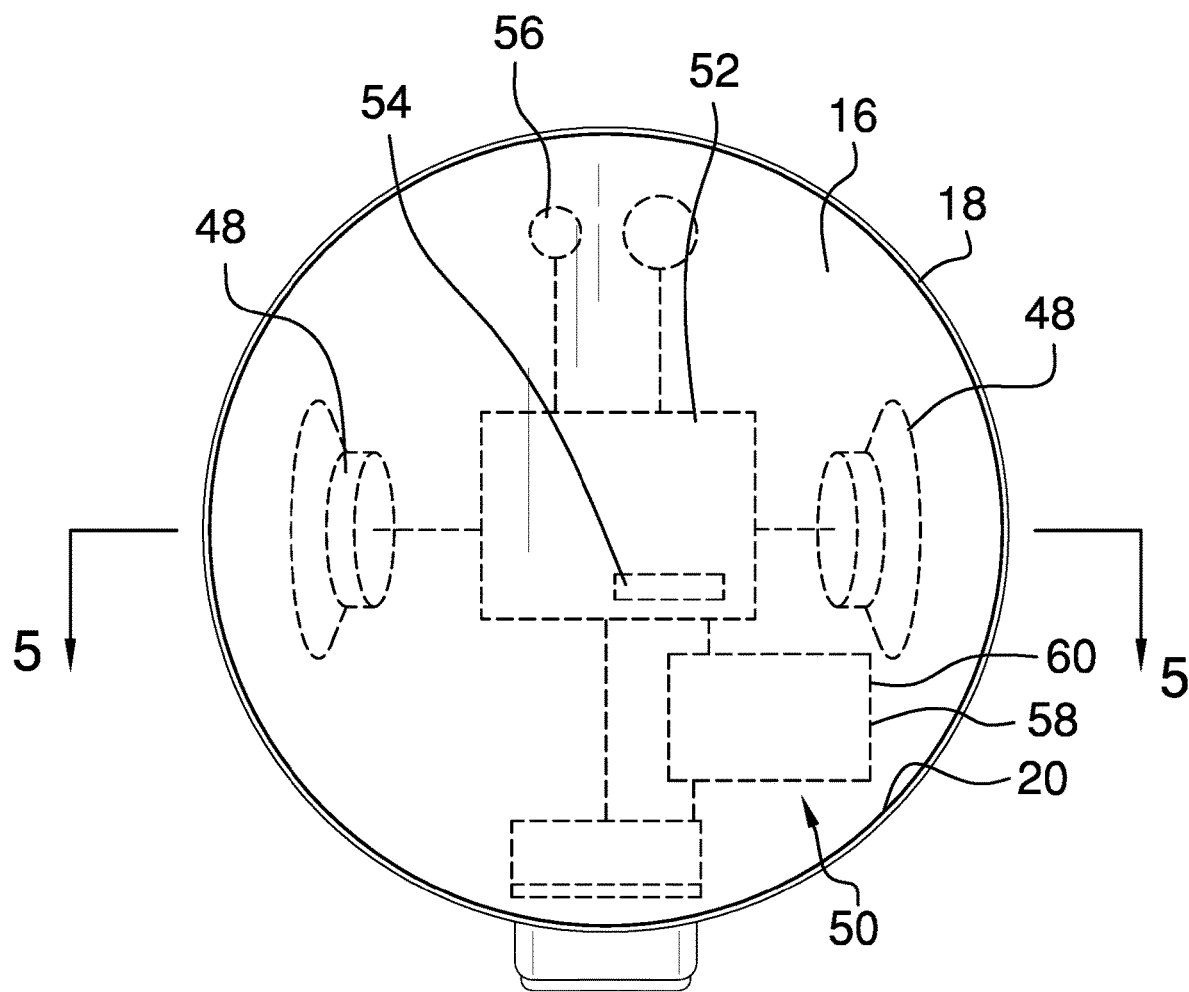
FIG. 4 is a bottom phantom view of an embodiment of the disclosure.
Figure 5:
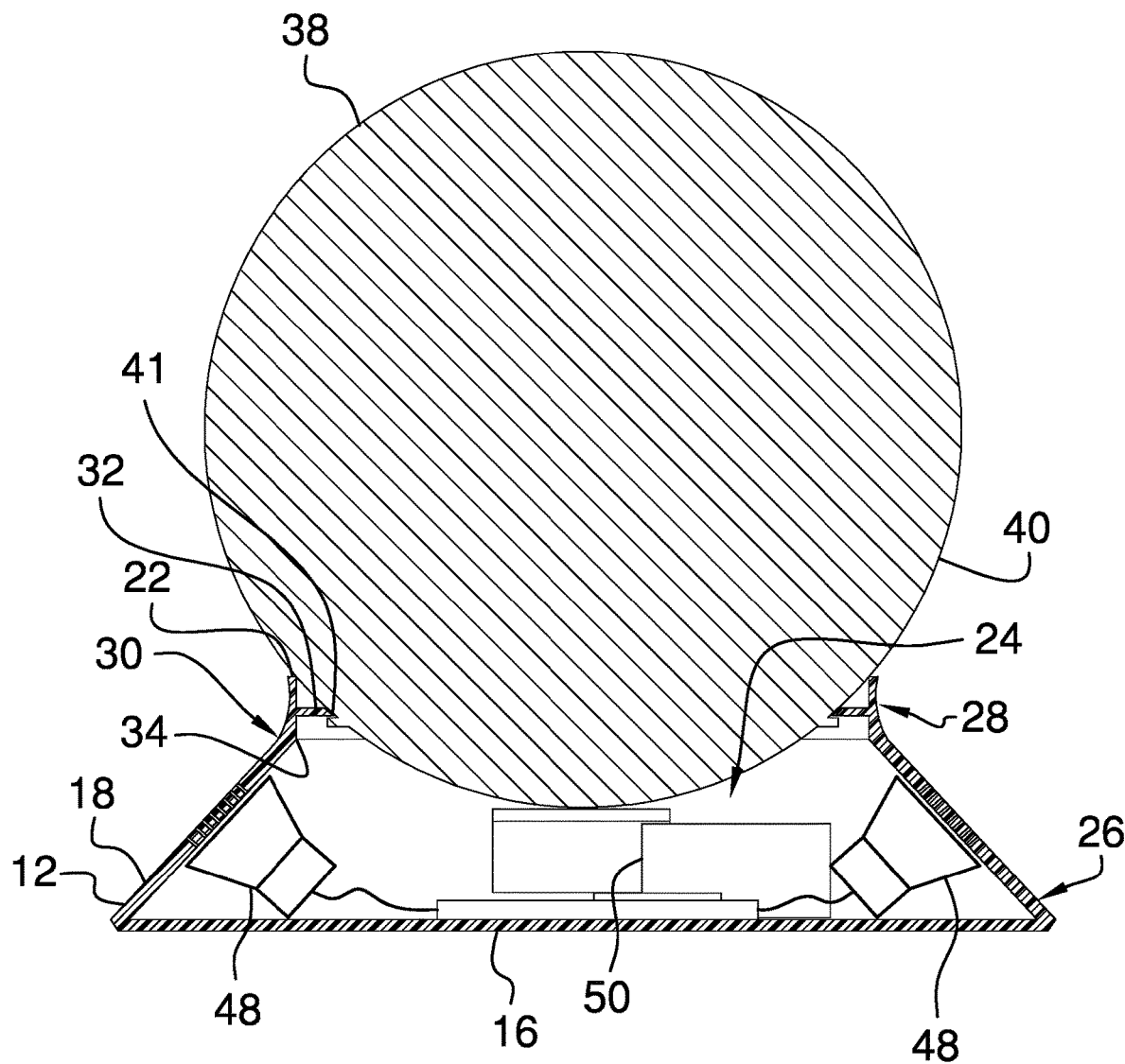
FIG. 5 is a cross sectional view taken along line 5-5 of FIG. 4 of an embodiment of the disclosure.

With reference now to the drawings, and in particular to FIGS. 1 through 5 thereof, a new holding device embodying the principles and concepts of an embodiment of the disclosure and generally designated by the reference numeral 10 will be described.

As best illustrated in FIGS. 1 through 5, the smartphone holding assembly 10 generally comprises a bowl 12 that is positionable on a support surface 14, such as a table top or other type of horizontal support surface 14. The bowl 12 has a bottom wall 16 and an outer wall 18 extending upwardly from a perimeter edge 20 of the bottom wall 16. The perimeter edge 20 of the bottom wall 16 is continuously arcuate about a center point of the bottom wall 16 such that the bottom wall 16 has a circular shape. The outer wall 18 has a distal edge 22 with respect to the bottom wall 16 defining an opening 24 in the bowl 12. Furthermore, the outer wall 18 has a sloped portion 26 and a vertical portion 28. The sloped portion 26 extends between the bottom wall 16 and the vertical portion 28, and the vertical portion 28 extends between the distal edge 22 and the sloped portion 26. The sloped portion 26 slopes inwardly between the bottom wall 16 and the vertical portion 28 such that the bowl 12 has a lowered center of gravity to inhibit the bowl 12 from tipping over.

The vertical portion 28 extends upwardly between the sloped portion 26 and the distal edge 22. A threshold 30 between the sloped portion 26 and the vertical portion 28 is positioned closer to the distal edge 22 than the bottom wall 16. The outer wall 18 has a lip 32 which extends inwardly from an inside surface 34 of the outer wall 18, and the lip 32 is spaced from the distal edge 22. The outer wall 18 has a pair of foraminous sections 36 that are positioned on opposite sides of the outer wall 18 from each other.

A sphere 38 is provided which is rotatably disposed in the bowl 12 such that the sphere 38 extends upwardly from the bowl 12. An outer surface 40 of the sphere 38 rests on the distal edge 22 of the outer wall 18 of the base and a distal edge 41 of the lip 32 on the outer wall 18 of the base. Furthermore, the sphere 38 has a diameter which is greater than a diameter of the opening 24 defined by the distal edge 22 thereby inhibiting the sphere 38 from falling into the bowl 12. The sphere 38 may be comprised of a resilient material which has friction reducing properties thereby enhancing rotating the sphere 38 in the bowl 12.

A mating unit 42 is coupled to the sphere 38 and the mating unit 42 can be matable to a personal electronic device 44. The personal electronic device 44 may comprise a smart phone, an electronic tablet or any other electronic device that employs wireless technology and an electronic display. The mating unit 42 extends outwardly from the sphere 38 for positioning the personal electronic device 44 at an optimal orientation for viewing the personal electronic device 44. The mating unit 42 extends outwardly from the outer surface 40 of the sphere 38. The mating unit 42 has a distal surface 46 with respect to the outer surface 40 and the distal surface 46 comprises a magnetic material to magnetically engage the personal electronic device 44.

A pair of speakers 48 is provided and each of the speakers 48 is positioned within the bowl 12 to emit audible sounds outwardly from the bowl 12. Each of the speakers 48 is in wireless communication with the personal electronic device 44 when the personal electronic device 44 is mated to the mating unit 42. In this way the speakers 48 can emit audible sounds received from the personal electronic device 44. Each of the speakers 48 is aligned with a respective one of the foraminous sections 36 of the outer wall 18 of the bowl 12. Furthermore, each of the speakers 48 may comprise an electromagnetic speaker of any conventional design.

A communication unit 50 is integrated into the bowl 12 and the communication unit 50 is in electrical communication with each of the speakers 48. Additionally, the communication unit 50 broadcasts a pairing signal to facilitate the communication unit 50 to be wirelessly paired to the personal electronic device 44 for streaming data from the personal electronic device 44. The communication unit 50 comprises a control circuit 52 that is integrated into the bowl 12 and to which each of the speakers 48 is electrically coupled. The communication unit 50 includes a transceiver 54 that is integrated into the bowl 12. The transceiver 54 is electrically coupled to the control circuit 52 and the transceiver 54 broadcasts the pairing signal to the personal electronic device 44. The transceiver 54 may be a radio frequency transceiver 54 or the like and the transceiver 54 may employ Bluetooth communication protocols.

The communication unit 50 includes a pairing button 56 that is movably integrated into the outer wall 18 of the bowl 12 and the pairing button 56 is electrically coupled to the control circuit 52. The transceiver 54 performs a pairing sequence when the pairing button 56 is depressed. In this way the transceiver 54 is wirelessly paired with the personal electronic device 44. The pairing sequence may be a Bluetooth pairing sequence or other similar set of protocols.

A power supply 58 is integrated into the bowl 12 and the power supply 58 is electrically coupled to the control circuit 52. The power supply 58 comprises a battery 60 that is integrated into the bowl 12, and the battery 60 is electrically coupled to the control circuit 52. The power supply 58 includes a power button 62 that is movably integrated into the outer wall 18 of the bowl 12. The power button 62 is electrically coupled to the control circuit 52 for turning the control circuit 52 on and off. The power supply 58 includes a charge port 64 that is recessed into the outer wall 18 of the bowl 12 to insertably receive a charge cord 66. Additionally, the charge port 64 is electrically coupled to the battery 60 for charging the battery 60.

In use, the personal electronic device 44 is placed against the distal surface of the mating unit 42 to retain the personal electronic device 44 on the sphere 38. In this way the sphere 38 can be rotated to position the personal electronic device 44 in almost any orientation, depending on a user's preference. The pairing button 56 is depressed to pair the personal electronic device 44 with the transceiver 54. In this way the speakers 48 can emit audio streamed from the personal electronic device 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smartphone holding assembly for holding a smartphone in a variety of orientations, said assembly comprising:
 a bowl being positionable on a support surface;
 a sphere being rotatably disposed in said bowl having said sphere extending upwardly from said bowl;
 a mating unit being coupled to said sphere wherein said mating unit is configured to be ratable to a personal electronic device, said mating unit extending outwardly from said sphere wherein said mating unit is configured to position the personal electronic device at an optimal orientation for viewing the personal electronic device;
 a pair of speakers, each of said speakers being positioned within said bowl wherein each of said speakers is configured to emit audible sounds outwardly from said bowl, each of said speakers being in wireless communication with the personal electronic device when the personal electronic device is mated to said mating unit wherein said speakers are configured to emit audible sounds received from the personal electronic device;
 a communication unit being integrated into said bowl, said communication unit being in electrical communication with each of said speakers, said communication unit broadcasting a pairing signal wherein said communication unit is configured to be wirelessly paired to the personal electronic device for streaming data from the personal electronic device;

wherein said bowl has a bottom wall and an outer wall extending upwardly from a perimeter edge of said bottom wall, said perimeter edge of said bottom wall being continuously arcuate about a center point of said bottom wall such that said bottom wall has a circular shape;

wherein said outer wall has a distal edge with respect to said bottom wall defining an opening in said bowl, said outer wall having a sloped portion and a vertical portion, said sloped portion extending between said bottom wall and said vertical portion, said vertical portion extending between said distal edge and said sloped portion;

wherein said sloped portion slopes inwardly between said bottom wall and said vertical portion such that said bowl has a lowered center of gravity to, inhibit said bowl from tipping over, said vertical portion extending upwardly between said sloped portion and said distal edge;

wherein a threshold between said sloped portion and said vertical portion is positioned closer to said distal edge than said bottom wall;

wherein said outer wall has a lip extending inwardly from an inside surface of said outer wall, said lip being spaced from said distal edge, an outer surface of said sphere resting on said distal edge of said outer wall of said base and a distal edge of said lip on said outer wall of said base; and wherein said outer wall has a pair of foraminous sections being positioned on opposite sides of said outer wall from each other, each of said speakers being aligned with a respective one of said foraminous sections.

2. The assembly according to claim 1, wherein said mating unit extends outwardly from said outer surface of said sphere, said mating unit having a distal surface with respect to said outer surface, said distal surface comprising a magnetic material wherein said distal surface is configured to magnetically engage the personal electronic device.

3. The assembly according to claim 1, wherein said communication unit comprises:
a control circuit being integrated into said bowl, said control circuit being electrically coupled to each of said speakers;
a transceiver being integrated into said bowl, said transceiver being electrically coupled to said control circuit, said transceiver broadcasting said pairing signal to the personal electronic device; and
a pairing button being movably integrated into said outer wall of said bowl, said pairing button being electrically coupled to said control circuit, said transceiver performing a pairing sequence when said pairing button is depressed wherein said transceiver is configured to be wirelessly paired with the personal electronic device.

4. The assembly according to claim 3, further comprising a power supply being integrated into said bowl, said power supply being electrically coupled to said control circuit, said power supply comprising:
a battery being integrated into said bowl, said battery being electrically coupled to said control circuit;
a power button being movably integrated into said outer wall of said bowl, said power button being electrically coupled to said control circuit for turning said control circuit on and off; and
a charge port being recessed into said outer wall of said bowl wherein said charge port is configured to insertably receive a charge cord, said charge port being electrically coupled to said battery for charging said battery.

5. A smartphone holding assembly for holding a smartphone in a variety of orientations, said assembly comprising:
a bowl being positionable on a support surface, said bowl having a bottom wall and an outer wall extending upwardly from a perimeter edge of said bottom wall, said perimeter edge of said bottom wall being continuously arcuate about a center point of said bottom wall such that said bottom wall has a circular shape, said outer wall having a distal edge with respect to said bottom wall defining an opening in said bowl, said outer wall having a sloped portion and a vertical portion, said sloped portion extending between said bottom wall and said vertical portion, said vertical portion extending between said distal edge and said sloped portion, said sloped portion sloping inwardly between said bottom wall and said vertical portion such that said bowl has a lowered center of gravity to inhibit said bowl from tipping over, said vertical portion extending upwardly between said sloped portion and said distal edge, a threshold between said sloped portion and said vertical portion being positioned closer to said distal edge than said bottom wall, said outer wall having a lip extending inwardly from an inside surface of said outer wall, said lip being spaced from said distal edge, said outer wall having a pair of foraminous sections being positioned on opposite sides of said outer wall from each other;
a sphere being rotatably disposed in said bowl having said sphere extending upwardly from said bowl, said an outer surface of said sphere resting on said distal edge of said outer wall of said base and a distal edge of said lip on said outer wall of said base;
a mating unit being coupled to said sphere wherein said mating unit is configured to be matable to a personal electronic device, said mating unit extending outwardly from said sphere wherein said mating unit is configured to position the personal electronic device at an optimal orientation for viewing the personal electronic device, said mating unit extending outwardly from said outer surface of said sphere, said mating unit having a distal surface with respect to said outer surface, said distal surface comprising a magnetic material wherein said distal surface is configured to magnetically engage the personal electronic device;
a pair of speakers, each of said speakers being positioned within said bowl wherein each of said speakers is configured to emit audible sounds outwardly from said bowl, each of said speakers being in wireless communication with the personal electronic device when the personal electronic device is mated to said mating unit wherein said speakers are configured to emit audible sounds received from the personal electronic device, each of said speakers being aligned with a respective one of said foraminous sections of said outer wall of said bowl; and
a communication unit being integrated into said bowl, said communication unit being in electrical communication with each of said speakers, said communication unit broadcasting a pairing signal wherein said communication unit is configured to be wirelessly paired to the personal electronic device for streaming data from the personal electronic device, said communication unit comprising:
- a control circuit being integrated into said bowl, said control circuit being electrically coupled to each of said speakers;
- a transceiver being integrated into said bowl, said transceiver being electrically coupled to said control circuit, said transceiver broadcasting said pairing signal to the personal electronic device;
- a pairing button being movably integrated into said outer wall of said bowl, said pairing button being electrically coupled to said control circuit, said transceiver performing a pairing sequence when said pairing button is depressed wherein said transceiver is configured to be wirelessly paired with the personal electronic device; and
- a power supply being integrated into said bowl, said power supply being electrically coupled to said control circuit, said power supply comprising:
  - a battery being integrated into said bowl, said battery being electrically coupled to said control circuit;
  - a power button being movably integrated into said outer wall of said bowl, said power button being electrically coupled to said control circuit for turning said control circuit on and off; and
  - a charge port being recessed into said outer wall of said bowl wherein said charge port is configured to insertably receive a charge cord, said charge port being electrically coupled to said battery for charging said battery.

6. A smartphone holding system for holding a smartphone in a variety of orientations, said system comprising:
- a personal electronic device;
- a bowl being positionable on a support surface, said bowl having a bottom wall and an outer wall extending upwardly from a perimeter edge of said bottom wall, said perimeter edge of said bottom wall being continuously arcuate about a center point of said bottom wall such that said bottom wall has a circular shape, said outer wall having a distal edge with respect to said bottom wall defining an opening in said bowl, said outer wall having a sloped portion and a vertical portion, said sloped portion extending between said bottom wall and said vertical portion, said vertical portion extending between said distal edge and said sloped portion, said sloped portion sloping inwardly between said bottom wall and said vertical portion such that said bowl has a lowered center of gravity to inhibit said bowl from tipping over, said vertical portion extending upwardly between said sloped portion and said distal edge, a threshold between said sloped portion and said vertical portion being positioned closer to said distal edge than said bottom wall, said outer wall having a lip extending inwardly from an inside surface of said outer wall, said lip being spaced from said distal edge, said outer wall having a pair of foraminous sections being positioned on opposite sides of said outer wall from each other;
- a sphere being rotatably disposed in said bowl having said sphere extending upwardly from said bowl, said an outer surface of said sphere resting on said distal edge of said outer wall of said base and a distal edge of said lip on said outer wall of said base;
- a mating unit being coupled to said sphere, said mating unit being ratable to said personal electronic device, said mating unit extending outwardly from said sphere to position said personal electronic device at an optimal orientation for viewing said personal electronic device, said mating unit extending outwardly from said outer surface of said sphere, said mating unit having a distal surface with respect to said outer surface, said distal surface comprising a magnetic material to magnetically engage said personal electronic device;
- a pair of speakers, each of said speakers being positioned within said bowl wherein each of said speakers is configured to emit audible sounds outwardly from said bowl, each of said speakers being in wireless communication with the personal electronic device when the personal electronic device is mated to said mating unit to emit audible sounds received from said personal electronic device, each of said speakers being aligned with a respective one of said foraminous sections of said outer wall of said bowl; and
- a communication unit being integrated into said bowl, said communication unit being in electrical communication with each of said speakers, said communication unit broadcasting a pairing signal thereby facilitating said communication unit to be wirelessly paired to said personal electronic device for streaming data from said personal electronic device, said communication unit comprising:
  - a control circuit being integrated into said bowl, said control circuit being electrically coupled to each of said speakers;
  - a transceiver being integrated into said bowl, said transceiver being electrically coupled to said control circuit, said transceiver broadcasting said pairing signal to said personal electronic device;
  - a pairing button being movably integrated into said outer wall of said bowl, said pairing button being electrically coupled to said control circuit, said transceiver performing a pairing sequence when said pairing button is depressed for pairing said transceiver with said personal electronic device; and
  - a power supply being integrated into said bowl, said power supply being electrically coupled to said control circuit, said power supply comprising:
    - a battery being integrated into said bowl, said battery being electrically coupled to said control circuit;
    - a power button being movably integrated into said outer wall of said bowl, said power button being electrically coupled to said control circuit for turning said control circuit on and off; and
    - a charge port being recessed into said outer wall of said bowl wherein said charge port is configured to insertably receive a charge cord, said charge port being electrically coupled to said battery for charging said battery.

* * * * *